Figure 1:
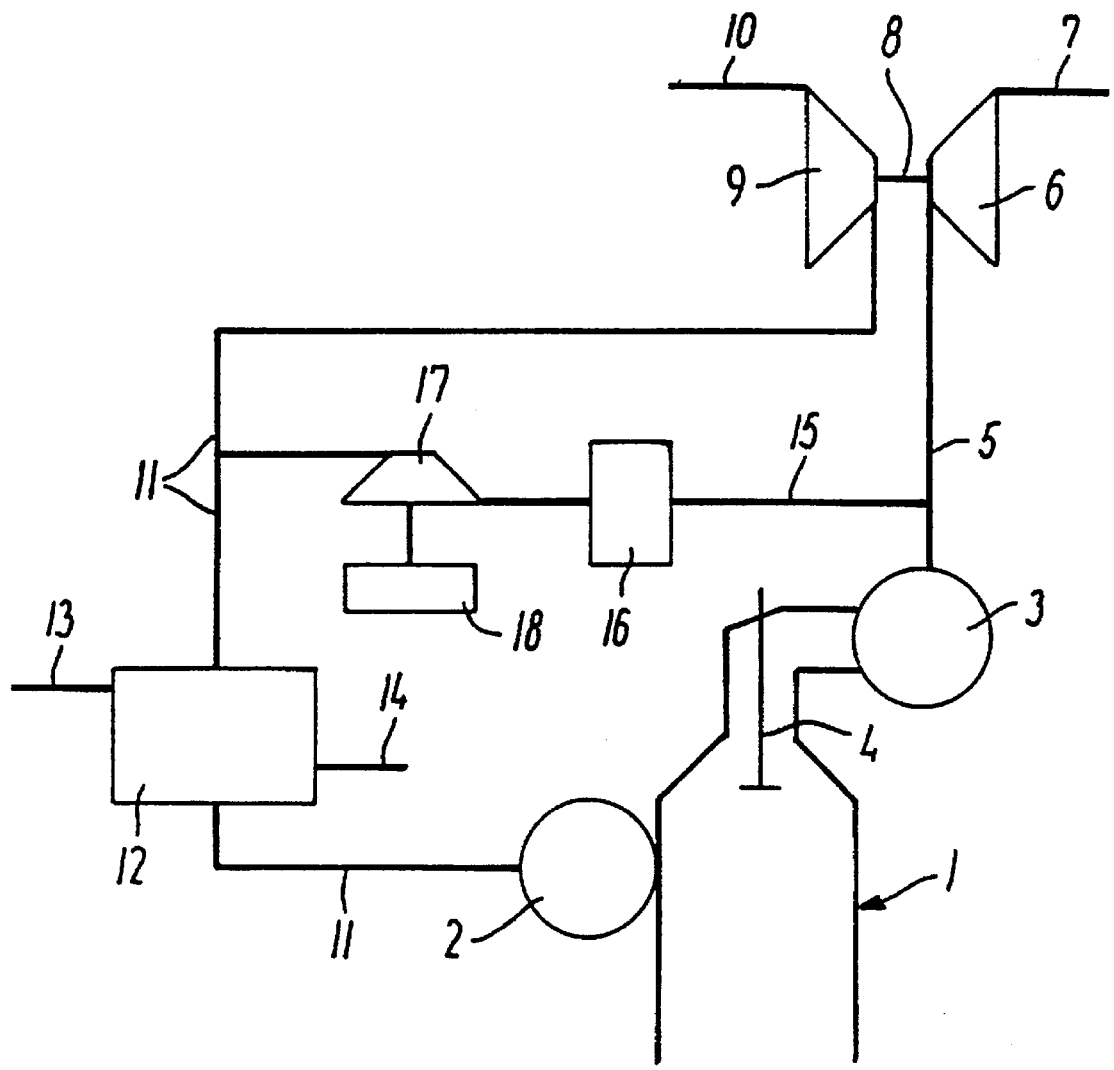

United States Patent

Kjemtrup et al.

[11] Patent Number: 5,657,630
[45] Date of Patent: Aug. 19, 1997

[54] LARGE SUPERCHARGED DIESEL ENGINE

[75] Inventors: Niels Kjemtrup, Copenhagen; Peter Berg-Sonne, Frederiksberg, both of Denmark

[73] Assignee: Man B&W Diesel A/S, Copenhagen, Denmark

[21] Appl. No.: 564,231

[22] PCT Filed: Dec. 2, 1993

[86] PCT No.: PCT/DK93/00398

§ 371 Date: Dec. 4, 1995

§ 102(e) Date: Dec. 4, 1995

[87] PCT Pub. No.: WO94/29587

PCT Pub. Date: Dec. 22, 1994

[30] Foreign Application Priority Data

Jun. 4, 1993 [DK] Denmark .................. 0650/93

[51] Int. Cl.$^6$ .................. F02B 47/02; F02B 47/08
[52] U.S. Cl. .................. 60/605.2; 123/256; 123/563; 123/570; 55/257.1
[58] Field of Search .................. 60/605.2, 599; 123/25 G, 563, 570; 55/257.1

[56] References Cited

U.S. PATENT DOCUMENTS

| | | | |
|---|---|---|---|
| 1,594,616 | 8/1926 | Heffernan | 123/25 G |
| 1,854,607 | 4/1932 | Andrews | 123/25 G |
| 1,890,107 | 12/1932 | Bowman | 123/25 G |
| 2,258,088 | 10/1941 | Dunn | 123/25 G |
| 3,605,710 | 9/1971 | Helwig . | |
| 4,356,806 | 11/1982 | Freesh . | |
| 4,440,116 | 4/1984 | Stevenson et al. . | |
| 5,131,229 | 7/1992 | Kriegler et al. | 60/605.2 |

FOREIGN PATENT DOCUMENTS

| | | |
|---|---|---|
| 0097097 | 4/1985 | European Pat. Off. . |
| 2443897 | 4/1975 | Germany . |
| 250430 | 8/1976 | Germany . |
| 4123046 | 9/1992 | Germany . |
| 535321 | 7/1976 | Japan . |
| 5515628 | 7/1976 | Japan . |
| 1177446 | 7/1989 | Japan . |
| 314555 | 9/1969 | Sweden . |
| 8801016 | 2/1988 | WIPO . |

OTHER PUBLICATIONS

Patent Abstracts of Japan, Publication No. 60–14097(A), published Jan. 24, 1985 (JP-A-58-120471).
Patent Abstracts of Japan, Publication No. 60–14098(A), published Jan. 24, 1985 (JP-A-58-120987).

*Primary Examiner*—Michael Koczo
*Attorney, Agent, or Firm*—Sughrue, Mion, Zinn, Macpeak & Seas

[57] ABSTRACT

Exhaust gas in a supercharged internal combustion engine is recycled from the high pressure side of the turbocharger to the charging air system of the engine. At least part of the recycled exhaust gas is humidified to largely 100 percent relative humidity. This on one hand cools the gas to that the temperature at initiation of the combustion in the engine cylinders is lowered, and on the other hand the heat capacity of the steam in the gas restricts the temperature raise occurring during the combustion. These factors both act to reduce the amount of $NO_x$ produced by the combustion. The addition of water is effected by a scrubber (16) which purifies the recycled gas. A blower (17) augments the pressure of the recycled gas. The scrubber may be made to generate fresh water by designing it with several stages where sea water is supplied to the first stage and fresh water to the last stage.

3 Claims, 3 Drawing Sheets

LARGE SUPERCHARGED DIESEL ENGINE

The invention relates to a large supercharged diesel engine, such as a main engine of a ship, comprising a turbocharger having a turbine driven by exhaust gas and a compressor driven by the turbine and supplying charging air to the cylinders of the engine, and a recycling passage for returning part of the exhaust gas to the engine cylinders.

Japanese patent publication No. 53-5321, for example, describes gasoline engines, wherein the $NO_x$ content of the exhaust gas has been restricted by recycling part of the exhaust gas to the intake system of the engine so that the maximum combustion temperature of the engine becomes lower. The amount of $NO_x$ produced by the combustion depends on the maximum combustion temperature in that an increasing temperature leads to a sharp increase in the amount of $NO_x$. Recycling of 5–20 percent of the exhaust gas may result in a reduction of up to 30percent of the amount of $NO_x$ in the exhaust gas, using prior art.

Naturally, it is desirable to restrict the engine emission of environmentally harmful compounds at source, but the known method for recycling exhaust gas is not without its problems. For example, the recycling tends to increase the amount of particles in the exhaust gas, which is visible as smoke. This is probably due to the fact that the oxygen content of the charging air drops with the increased degree of recycling.

DE-A 25 04 308 describes an engine wherein part of the exhaust gas is purified by bubbling through a water bath before the recycling to the intake side. It is stated that the purified gas contains steam which does not contribute to lowering the $NO_x$ content, but instead results in reduced fuel consumption.

DE-C 41 23 046 describes an engine which by use of a pump or compressor presses recycled exhaust gas through a material with fine pores so that the gas passes through a water bath as finely distributed bubles. The engine is not supercharged.

It is known from WO 88/01016 to purify the exhaust gas from a diesel engine in a water bath and then recycle part of the purified and humidified gas to the intake side of the engine. The humidification in the water bath results in a certain cooling of the exhaust gas and contributes to keeping down the maximum combustion temperature. As the steam has a large specific heat capacity, the effect of recycling exhaust gas is greater than in the above methods. The engine is not supercharged, and the water consumption is large, because all the exhaust gas is humidified.

Large diesel engines normally use heavy fuel oil as fuel, which results in large amounts of combustion products which are very aggressive to the engine components in contact with the exhaust gas. The heavily polluting exhaust gas cannot be sufficiently purified by bubbling through a water bath. It is known from DT-A-24 43 897 to pass exhaust gas to the intake side of a diesel engine in order to reduce the $NO_x$ formation during combustion. To avoid the impurities from the diesel engine's own exhaust gas, the exhaust gas from a gasoline engine is used instead as the recycling gas for the diesel engine. This solution renders the engine plant substantially more complicated and is also inapplicable in a ship where normally only a very limited amount of fuel in the form of gasoline is allowed.

SE-B 314 555 and U.S. Pat. No. 4,440,116 describe turbo-charged engines wherein water is injected in the intake air upstream of the compressor to limit the temperature increase of the intake air during compression. In large high-powered diesel engines, such a water addition may result in disadvantageously rapid corrosion of the sensitive compressor, as even a very small amount of fine drops of water can erode the blades of the compressor wheel.

The object of the invention is to enable recycling of exhaust gas in a large supercharged diesel engine in such a manner that the engine maintains high efficiency and a long life for the engine components, particularly expensive components, such as turbochargers, and that the components of the recycling system are of small dimensions advantageous to the integration with the engine.

With a view to this object, the above large diesel engine is according to the invention characterized in that the recycling passage includes a unit for humidification of the exhaust gas with water, that the humidification unit is a scrubber having a number of water atomizing stages, that the recycling passage comprises a conduit which branches off from the exhaust conduit upstream of the turbine and is connected with the charging air conduit downstream of the compressor, and that the conduit is connected with the scrubber and with a blower, preferably positioned downstream of the scrubber, for augmentation of the pressure in the recycled exhaust gas.

By using a scrubber having at least one water atomizer stage for purification of the exhaust gas, the purification becomes so efficient that the diesel engine's own exhaust gas may be recycled even when the engine is run on heavy fuel oil. The scrubber does not require much space, and the arrangement of the atomizer nozzles of the scrubber in the flow passage of the exhaust gas only results in an advantageously small pressure drop over the scrubber, which is of importance for the maintenance of high engine efficiency. Over a very short gas flow length the scrubber is able to atomize very large amounts of water into the recycled gas, which is of importance for obtaining the desired good purification, efficient cooling and humidification to largely 100 percent relative humidity. The scrubber yields a higher cooling of the recycled gas than the known humidifiers, which promotes the reduction of the formation of $NO_x$.

The blower in the recycling passage renders the recycling possible regardless of the pressure ratios between the intake and exhaust sides of the engine, which means that recycling may be effected at any desired engine load.

The exhaust gas is diverted upstream of the turbine of the turbocharger and is cooled and purified by means of the addition of water. The blower discharges the recycled gas downstream of the compressor of the turbocharger. The dimensions of the turbine and compressor of the turbocharger may be reduced because the recycled gas does not have to be compressed in the compressor. The preferred cooling of the gas upstream of the blower reduces the energy consumption of the blower to about half, judged in relation to a situation where the blower would have to compress uncooled exhaust gas. Furthermore, the sensitive blower is not subjected to the corrosive products in the exhaust gas.

The purification of the recycled gas may be promoted by removing water drops from the exhaust gas after the addition of atomized water at each stage. The water addition in a second stage results in a drop of the gas temperature, which causes condensation of water from the 100 percent humidity-saturated gas. The condensation will occur first on the particulate impurities to be found in the gas. When the water drops are then removed from the gas before it leaves the stage, the undesired impurities will be removed with the drops. If the temperature of the gas thus purified is lowered further by addition of water in a subsequent stage, this temperature drop will lead to condensation from the gas of more than the last added amount of water, and this water will be largely pure. This means that the gas may be purified in the scrubber without any particular water consumption.

In a particularly suitable embodiment, the scrubber is connected with the charging air conduit and cools both the air compressed by the compressor and the recycled exhaust gas. Thus, the well-known pipe cooler for cooling the charging air may be dispensed with. This results in an advantageous simplification of the intake system of the engine, but it is also possible, with the direct water cooling of the charging air and the recycled exhaust gas contained therein, to obtain a gas temperature at the intake to the combustion chambers which is from 10° to 12° C. lower than the temperature obtainable with a pipe cooler.

Other things being equal, such a reduction of the charging air temperature results in an improvement of the specific fuel oil consumption (SFOC) of about 1 g/hph. The lower charging air temperature also reduces the maximum combustion temperature and thus the $NO_x$ content of the exhaust gas. The above advantages of the invention are further exploited fully, because all the air passed to the combustion chamber is humidified under all operation conditions for the engine. Thus the $NO_x$ amount is about halved. If the engine is used on a ship, an additional result is that the charging air is purified of the salt content which is often found in the intake air, whereby the engine is not subjected to corrosive influences from the salt.

In a preferred embodiment, which is particularly useful in a ship, the scrubber has a first humidification stage wherein atomizer nozzles atomize sea water in the through-flowing gas, an intermediate purification stage wherein the liquid drops suspended in the gas are separated from the gas, and at least one final cooling stage wherein atomizer nozzles atomize fresh water in the through-flowing gas, and from which condensed fresh water is removed.

Very large amounts of water must be used for humidification and purification of the exhaust gas. Typically, the water consumption is from 3 to 4 times larger than the fuel oil consumption of the engine. In a large medium-size diesel engine with an output of 35.000 h.p., this results in a water Consumption of 12-17 tonnes per hour. On board a ship it is relatively energy-consuming to produce fresh water, which is usually done in special freshwater generators converting the sea water into fresh water by evaporation at low pressure.

In the preferred embodiment, the problem of freshwater consumption is solved by humidification and purification in several stages, and by the use of sea water in the first stage, and fresh water in at least the last water addition stage. The sea water is available in unlimited amounts, and, as mentioned above, the salt will be removed from the gas together with the other pollutants. If water is also added in a third and optionally in a fourth stage, the temperature drop of the gas caused thereby will result in a separation of fresh water which by far exceeds the added amount of fresh water. In addition to covering the water requirement for the purification, it is possible to obtain the further advantage of an actual production of fresh water which may be used elsewhere in the ship.

Figure 2:
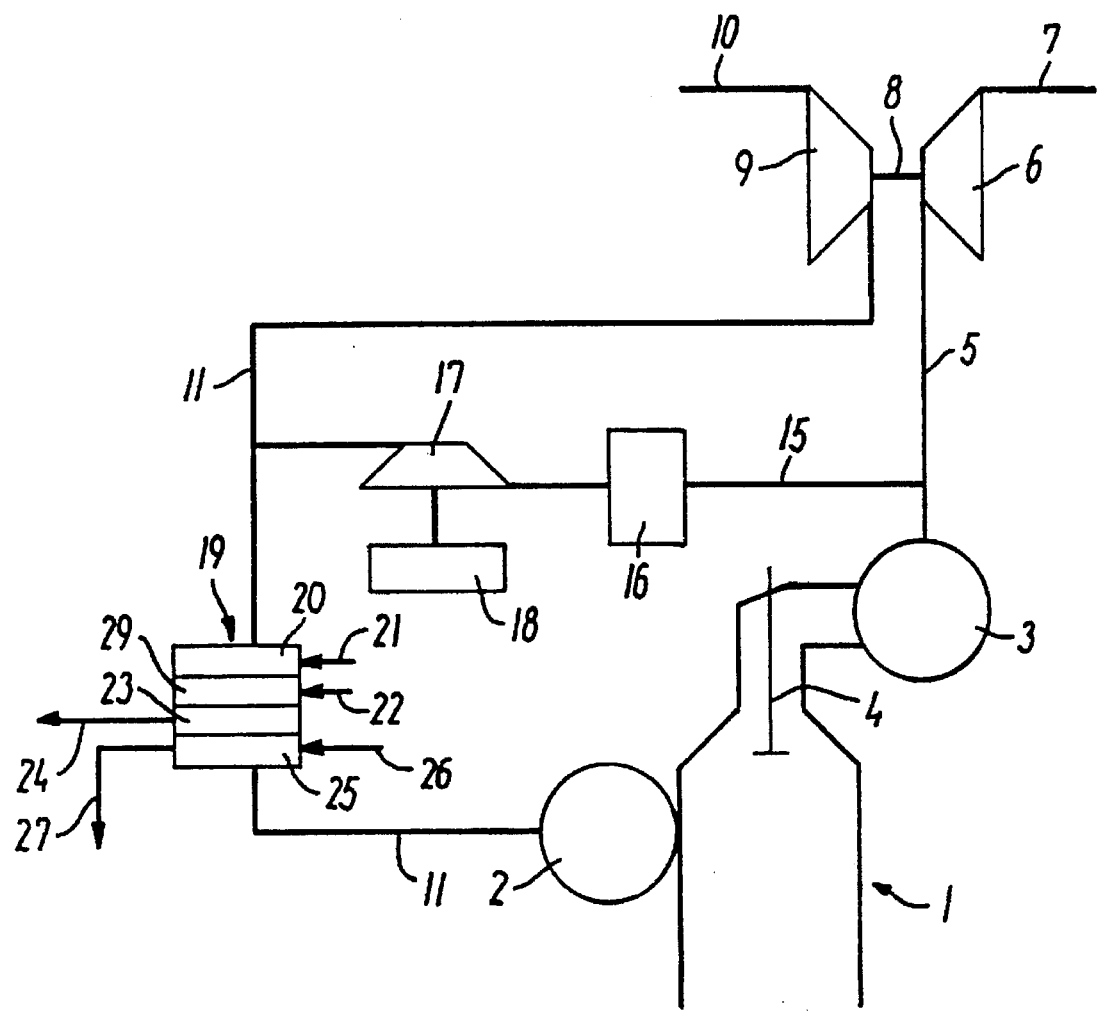
Figure 3:
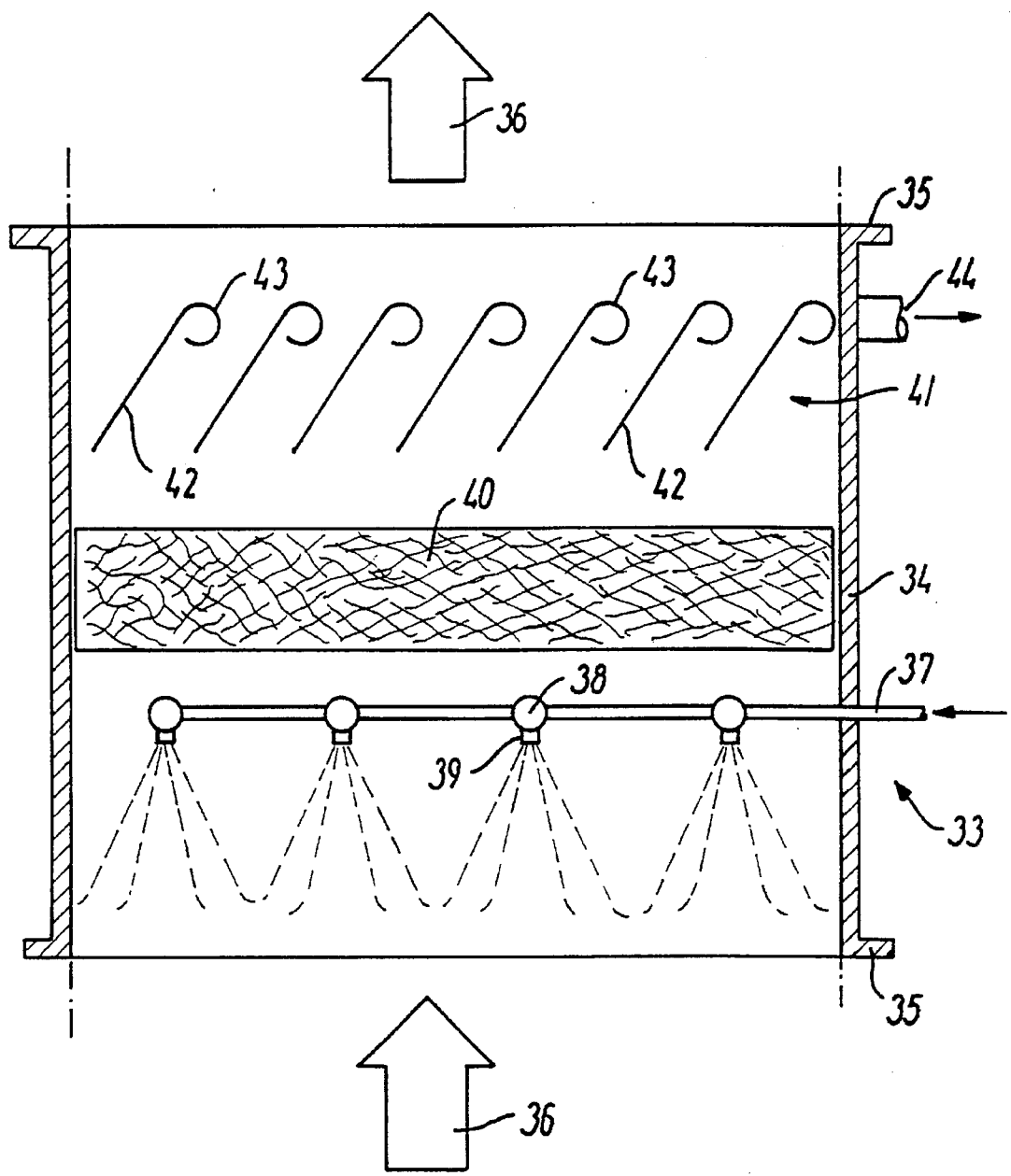

Examples of embodiments according to the invention will now be explained below in greater detail with reference to the very schematic drawing, in which FIGS. 1 and 2 illustrate diagrams of two different embodiments of the intake and exhaust systems of an internal combustion engine according to the invention, and FIG. 3 is an outline of a stage in a scrubber.

In the three embodiments, the internal combustion engine is generally designated 1. The engine has a charging air receiver 2 and an exhaust receiver 3, and the exhaust valves belonging to the combustion chambers are indicated by 4. The engine may be a large two-stroke constant-pressure-charged diesel engine, which may be used as the main engine in a ship or as a stationary engine for operating a generator in a power station. The total output of the engine may, for example, range from 5,000 to 70,000 kW, but the invention may also be used in four-stroke engines with an output of, for example, 1,000 kW.

The charging air is passed from the charging air receiver to the individual cylinders and scavenging air ports. When the exhaust valve 4 is opened, the exhaust gas flows through an exhaust conduit into the exhaust receiver 3 and onwards through a conventional exhaust conduit 5 to a turbine 6 of a turbocharger, from which the exhaust gas flows away through the exhaust conduit 7. Via a shaft 8, the turbine 6 drives a compressor 9 supplied via an air intake 10. The compressor delivers pressurized charging air to a charging air conduit 11 leading to the charging air receiver 2.

The embodiment shown in FIG. 1 is particularly relevant in cases where an existing engine is rebuilt for operation according to the invention without replacement of the existing tube cooler 12 for cooling the charging air. The tube cooler has a cooling water inlet 13 and a cooling water outlet 14. Normally, such a tube cooler can only cool the charging air to a temperature about 15° C. above the cooling water temperature.

A recycling conduit 15 branches off from the exhaust conduit 5 and is connected with the charging air conduit 11 so that the recycling conduit forms a recycling passage together with the part of the intake system which is downstream of the connection of the conduit 15 to the conduit 11.

A scrubber 16 has been inserted in the conduit 15 for humidification and purification of the exhaust gas with water. The gas outlet from the scrubber 16 leads to a blower 17 driven by an engine 18. Even though the exhaust gas is diverted at the high-pressure side of the turbine 6, the blower 17 has to provide it with an increase in pressure which increases the pressure in the recycled exhaust gas to above the charging air pressure in the conduit 11. The scrubber 16 may have one or more stages depending on the degree of purification and cooling of the exhaust gas.

The second embodiment shown in FIG. 2 differs from the first embodiment in that the tube cooler 12 has been replaced by a water scrubber 19 having four stages. In a first stage 20, pressurized sea water from a pipe 21 is passed to atomizer nozzles which humidify and cool the gas with a suitable excess of water so that no salt particles are precipitated in the gas. The end of the first stage contains a drop collector which separates the liquid drops suspended in the gas and containing the undesired pollutants from the gas. In a second stage 29, fresh water supplied through a pressurized pipe 22 is atomized into the gas and thus causes a further cooling with subsequent water condensation on any remaining particles therein. A third stage 23 contains a drop collector which removes the liquid drops suspended in the gas. Through a pipe 24, the separated water is passed overboard or to a tank for later purification. Even if the water is passed overboard, it is possible to obtain an environmental advantage as the undesired substances in the exhaust gas are thus deposited directly in the sea without having to go via the atmosphere. If desired, the water may be purified with slaked lime and optionally filtered before discharge. In a fourth stage 25, fresh water supplied through a pipe 26 is atomized into the gas, which, as mentioned above, causes condensation of an even larger amount of fresh water which is removed from the scrubber through a pipe 27, the gas temperature being brought to very close to the inlet temperature of the water. The scrubber may have fewer stages, but then the cooling of the gas will be less.

FIG. 3 shows an example of the embodiment of a stage 33 in a scrubber for arranging in the recycling passage. The housing 34 of the scrubber may be connected with the gas-transporting conduit by means of flanges 35 or with further scrubber stages. The gas flow direction is indicated by arrows 36. An inlet pipe 37 for fresh or sea water leads the water to distributor tubes 38 each carrying a number of nozzles 39 which atomize the water into the gas. In the embodiments shown, the nozzles spray the water out against the direction of flow of the gas, which gives a good evaporation and purification effect, but it is, of course, also possible to use nozzles spraying in the direction of flow of the gas. After passage of the nozzles, the gas flows through a drop generator 40 containing large surfaces which are angled in relation to the direction of flow of the gas. The material of the drop generator may, for example, consist of very porous foam, wire mesh or steel wool. In the drop generator, small liquid drops in the gas will join together into larger drops, which facilitates the subsequent removal of the drops from the gas in a drop collecting section 41 which, as shown, may contain elongated plate sections 42 which are inclined in relation to the direction of flow of the gas so that the gas is forced to change its direction upon passage of the plates 42. As a consequence of the inertia of the drops, they will be slower to change their direction than the gas itself, and the drops will therefore land on the plates 42 and slide along them into a folded-over end portion 43 where the drops are caught and passed to a collecting channel discharging the condensate and the removed liquid to a discharge pipe 44. It will often be possible to omit the drop generator 40 which may cause a certain flow resistance. If the scrubber has several consecutive atomizer stages, each stage preferably contains a drop collecting section so that subsequent stages do not have to cool the amount of liquid removed in the drop collecting section. If the scrubber only has to purify the recycled amount of gas, it is often possible to obtain sufficient purification in a single scrubber stage. The scrubber only yields low flow resistance and requires substantially no maintenance and is also cheap to manufacture.

The below examples describe the mode of operation of the scrubber in an engine plant where the recycled gas is purified in a scrubber and all the intake air is cooled in a two-stage scrubber. For the sake of simplicity, calculations are based on an engine of a full-load output of 10,000 kW and a nominal charging air pressure of 3.55 bar.

EXAMPLE 1

The engine is run at 100 percent load, and ambient air has a temperature of 25° C. and a relative humidity of 30 percent, which means that the intake air will contain about 6 g of water/kg of air. The air consumption of the engine is about 22 kg/s. After the compressor 9, the temperature of the air is $T_1=185°$ C.

In the first scrubber stage, the atomizer nozzles are supplied with an amount of salt water of 2.6 l/s, whereby the air is cooled by evaporation to a temperature of about $T_1=70°$ C., and the air is at the same time humidified to 100 percent relative humidity, resulting in a water content of 60 g/kg of air. In the drop collector, a water amount of about 1.3 l/s is removed. At discharge from the first scrubber stage, the air is largely purified of any salt content.

In the second scrubber stage, a fresh water amount of 35 l/s is sprayed out through the atomizer nozzles at a water temperature of about $T_v=25°$ C. This cools the air to a temperature of about $T_1=35°$ C., where the 100 percent humidity-saturated air has a water content of about 9 g/kg of air. In the drop collector, a water amount of about 36.1 l/s is separated, whereby the second scrubber stage produces an amount of fresh water of 1.1 l/s, corresponding to about 95 tons per day. Extremely high coefficients of heat transfer have been measured at atomization cooling of the intake air, and it is estimated that the coefficients of heat transfer are about 50–100 times as high as in conventional pipe coolers. If desired, the air in a third scrubber stage may be cooled to a few degrees above water temperature, which will result in a further production of fresh water.

If a separate scrubber 16 is used for purification of the recycled exhaust gas in the conduit 15, it will be suitable, simultaneously with the purification, to cool the exhaust gas from the inlet temperature of about 375° C. to the temperature of the intake air of $T_1=185°$ C. after the compressor. The water consumption in the scrubber 16 will be about 0.07 l/s, corresponding to 5.7 tonnes per day. This consumption may be covered by fresh water from the second scrubber without any problems. If a pipe cooler is used instead of said scrubber, the scrubber 16 may be operated with sea water.

EXAMPLE 2

With the same ambient conditions as above and an engine load of 75 percent, the atomizer nozzles in the first scrubber stage have to be supplied with an amount of sea water of at least 1.8 l/s, whereby the air is cooled to about $T_1=60°$ C. and humidified to 100 percent relative humidity, where the water content is at about 45 g/kg of air.

At the second scrubber stage, a water amount of 35 l/s is supplied at a temperature of about $T_v=25°$ C., whereby the gas is cooled to about $T_1=30°$ C., where the water content in the 100 percent saturated gas is about 12 g/kg of air. The second stage produces an amount of fresh water of about 0.5 l/s corresponding to 43 tonnes per day.

Purification of the recycled exhaust gas consumes an amount of water of about 0.10 l/s, corresponding to 8.6 tonnes per day.

Instead of the scrubbers described above, it is possible to use a scrubber known from an inert gas plant of the Japanese make Gadelius Marine K. K. and a drop collector from the same firm acting according to the cyclone principle. However, these known systems have the disadvantage of being bulky.

We claim:

1. A large supercharged diesel engine (1), such as a main engine of a ship, comprising a turbocharger having an exhaust gas-driven turbine (6) and a compressor (9) driven by the turbine and supplying charging air to the engine cylinders, and a recycling passage for returning part of the exhaust gas to the engine cylinders, characterized in that the recycling passage (15, 11) includes a unit for humidification of the exhaust gas with water, that the humidification unit is a scrubber (16, 19) having a number of water atomizer stages (20, 29, 25), that the recycling passage comprises a conduit (15) which branches off from the exhaust conduit (5) upstream of the turbine (6) and is connected with the charging air conduit (11) downstream of the compressor (9), and that the conduit is connected with the scrubber (16) and with a blower (17), for augmentation of the pressure in the recycled exhaust gas.

2. A diesel engine according to claim 1, characterized in that the scrubber (19) is connected with the charging air conduit (11) so that it cools both the air compressed by the compressor and the recycled exhaust gas.

3. A diesel engine according to claim 1 characterized in that the scrubber has

- a first humidification stage (20) wherein atomizer nozzles atomize sea water in the through-flowing gas,
- an intermediate purification stage (23) wherein the liquid drops suspended in the gas are separated from the gas, and
- at least one final cooling stage (25) wherein atomizer nozzles atomize fresh water in the through-flowing gas, and from which condensed fresh water is removed.

* * * * *